(12) United States Patent
Seki et al.

(10) Patent No.: US 8,942,496 B2
(45) Date of Patent: Jan. 27, 2015

(54) IMAGE PROCESSING APPARATUS AND IMAGE PROCESSING METHOD

(75) Inventors: Yoshitaka Seki, Osaka (JP); Masayuki Yamaguchi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 46 days.

(21) Appl. No.: 13/990,908

(22) PCT Filed: Nov. 4, 2011

(86) PCT No.: PCT/JP2011/075404
§ 371 (c)(1),
(2), (4) Date: May 31, 2013

(87) PCT Pub. No.: WO2012/073645
PCT Pub. Date: Jun. 7, 2012

(65) Prior Publication Data
US 2013/0243345 A1 Sep. 19, 2013

(30) Foreign Application Priority Data
Dec. 1, 2010 (JP) ................................. 2010-268772

(51) Int. Cl.
*G06K 9/46* (2006.01)
*G06T 9/00* (2006.01)
*G09G 5/393* (2006.01)
*G09G 5/395* (2006.01)
*H04N 19/433* (2014.01)
*H04N 19/426* (2014.01)

(52) U.S. Cl.
CPC *G06T 9/00* (2013.01); *G09G 5/393* (2013.01); *G09G 5/395* (2013.01); *H04N 19/00515* (2013.01); *H04N 19/00503* (2013.01); *G09G 2340/02* (2013.01)
USPC ........................................................ 382/233

(58) Field of Classification Search
None
See application file for complete search history.

(56) References Cited

U.S. PATENT DOCUMENTS

2006/0152501 A1 7/2006 Furihata et al.
2008/0259088 A1 10/2008 Eriguchi et al.

FOREIGN PATENT DOCUMENTS

JP 2006-19515 A 7/2006
JP 2008-268672 A 11/2008

*Primary Examiner* — Stephen R Koziol
*Assistant Examiner* — Amandeep Saini
(74) *Attorney, Agent, or Firm* — Birch Stewart Kolasch & Birch, LLP

(57) ABSTRACT

Provided is an image processing apparatus capable of simultaneous reduction in memory capacity and compressibility error. An output image data generating means 11 generates processed image data based on specific reference data and preprocessed image data. Reference data generating means 5 repeatedly executes an identical processing in one term made up of not less than two consecutive frames. When an object frame is a top frame in the term, restored reference data generated by data expanding means 15 is outputted as data expanding means. When the object frame is a second or subsequent frame in the term, simulated specific reference data is generated based on the restored reference data generated by the data expanding means 15 and preprocessed image data of the object frame, and outputted as specific reference data. When the object frame is a final frame in the term, in addition to the above operation, the reference data is generated based on the specific reference data and preprocessed image data of the object frame, and outputted to the data compressing means 13, to be compressed.

8 Claims, 13 Drawing Sheets

IMAGE PROCESSING APPARATUS AND IMAGE PROCESSING METHOD

CROSS-REFERENCE TO RELATED APPLICATIONS

This application is a National Phase filing under 35 U.S.C. §371 of International Application No. PCT/JP2011/075404 filed on Nov. 4, 2011, and which claims priority to Japanese Patent Application No. 2010-268772 filed on Dec. 1, 2010, all of which are hereby expressly incorporated by reference into the present application.

TECHNICAL FIELD

The present invention relates to an image processing technique, and particularly relates to an image processing technique in a system where similar image data is repeatedly inputted.

BACKGROUND ART

With rapid development of the semiconductor technology and increase in definition of image data in recent years, an amount of image data to be processed by a device or a system explosively goes on increasing. Further, due to improvement in quality of display in display means such as a liquid crystal panel, a request for image processing aimed at a higher added value, and emergence of 3D-TVs, there has been made a requirement for performing processing on a vast amount of image data.

At the time of performing arithmetic processing (correction processing, etc.) on image data, in many cases, image data in processing, data calculated from the image data, and some other data need to be temporarily held in a memory. However, with increasingly high definition of image data as described above, a vast amount of data is to be handled. For this reason, a large-capacity memory is required for holding those data into the memory while leaving them raw data. However, such a large-capacity memory is high-priced, and thus brings about a rise of manufacturing cost.

For suppressing manufacturing cost of the device and the system, an amount of data to be held may be reduced so as to allow processing without mounting of the large-capacity memory. As means for this, there is formed a configuration where the data to be held is once compressed to reduce an amount of the data, and this reduced data is held. This can reduce a required capacity of the memory. This is a technique being in general use.

The method of temporarily storing previously obtained processed data in the memory and reading the processed data from this memory to execute processing on pixel data as an object is applied to a variety of scenes. For example, Patent Document 1 below discloses a method of deciding a value of a voltage to be applied to a pixel electrode in accordance with a change from immediately preceding pixel data in order to improve response characteristics of a liquid crystal display device. This has been performed for the sake of solving a problem peculiar to liquid crystal in which a response speed at the time of a transmittance changing with respect to a change in applied voltage and charging characteristics with respect to a change in permittivity of liquid crystal are poor and sufficiently responding to a quick change in image signal is difficult.

Further, Patent Document 2 below discloses a technique regarding a display device for displaying a three-dimensional (3D) video. The 3D display system has a form of alternately displaying left eye images and right eye images to realize a 3D display. In the case of forming a configuration where the left eye image is outputted over each of first two consecutive frames and the right eye image is then outputted over each of next two consecutive frames, approximate image data is inputted in every two consecutive frames. At this time, in the case of making a pair of two frames, image data inputted in the first frame may be temporarily stored and image data of the next frame based on the stored image may be outputted.

PRIOR ART DOCUMENTS

Patent Documents

Patent Document 1: JP 2002-116743 A
Patent Document 2: JP 2009-232249 A

SUMMARY OF THE INVENTION

Problems to be Solved by the Invention

As thus described, in the case of performing image processing by use of already obtained past processed data, it is necessary to temporarily hold data in the memory. Then, in order to make a memory capacity small, compressed data obtained by performing compression processing on the processed data is stored in the memory, and this compressed data is read from the memory and subjected to expansion processing, to be used for image processing.

FIG. 12 is a conceptual block diagram showing a configuration of an image processing apparatus for performing the foregoing processing flow. A conventional image processing apparatus 50 shown in FIG. 12 is provided with output image data generating means 11, data compressing means 13, data expanding means 15, a memory 17, reference data generating means 60, preprocessed image data input terminal 21, and processed image data output terminal 23.

Image data as an object to be processed (hereinafter referred to as "preprocessed image data") is sequentially inputted into the preprocessed image data input terminal 21. For example, a configuration is considered where preprocessed image data made up of X pixels in a horizontal direction and Y pixels in a vertical direction is inputted in every frame.

The preprocessed image data inputted into the preprocessed image data input terminal 21 is transmitted to the output image data generating means 11 and the reference data generating means 60. At this time point, compressed data, obtained by compressing, with data compressing means 13, reference data generated in an immediately preceding frame (hereinafter referred to as "compressed reference data"), is stored in the memory 17.

The data expanding means 15 performs expansion processing on the compressed reference data of the immediately preceding frame stored in the memory 17, to generate restored data (hereinafter referred to as "restored reference data", and this generated data is then provided to the output image data generating means 11 and the reference data generating means 60.

The output image data generating means 11 generates processed output image data of an object frame based on input image data of the object frame and the restored reference data of the immediately preceding frame provided from the data expanding means 15, and outputs this generated data from the processed image data output terminal 23.

The reference data generating means 60 generates reference data of the object frame based on the input image data of the object frame and the restored reference data of the immediately preceding frame provided from the data expanding means 15. This reference data is compressed by the data compressing means 13, and stored in the memory 17 till a next frame.

FIG. 13 is a conceptual diagram schematically showing a series of processing in time-series order. It is to be noted that in FIG. 13, a flow of data, generated based on data subjected to compression processing by the data compressing means 13, is indicated by thick lines. Frames 0, 1, 2, 3, 4 are frames arrayed in this order in time-series order.

In the frame 0, the reference data generating means 60 generates reference data R0 of the frame 0. This reference data R0 is compressed by the data compressing means 13 to become compressed reference data r0, which is then stored in the memory 17.

At the starting point of the frame 1, the compressed reference data r0 is stored in the memory 17. The data expanding means 15 reads the compressed reference data r0 from the memory 17, performs expansion processing to generate restored reference data R0', and outputs this generated data to the reference data generating means 60. The reference data generating means 60 generates reference data R1 of the frame 1 based on the restored reference data R0' and preprocessed image data A1 inputted from the preprocessed image data input terminal 21.

The reference data R1 generated by the reference data generating means 60 is outputted to the output image data generating means 11 and the data compressing means 13. The data compressing means 13 performs the compression processing on the reference data R1 to generate compressed reference data r1, and stores this generated data into the memory 17. The output image data generating means 11 generates processed image data B1 of the frame 1 based on the preprocessed image data A1 and the reference data R1, and outputs the generated data from the processed image data output terminal 23.

In each frame j of the frame 2 and subsequent frames, similar processing to that for the frame 1 is performed. That is, the data expanding means 15 reads, from the memory 17, compressed reference data r1, generated in an immediately preceding frame i (i=j−1), and performs the expansion processing on this data, to generate restored reference data Ri'. The reference data generating means 60 then generates reference data Rj in the frame j based on the preprocessed image data Aj and the restored reference data Ri'. The output image data generating means 11 then generates processed image data Bj based on this reference data Rj and the preprocessed image data Aj. Further, this reference data Rj is compressed by the data compressing means 13 to become compressed reference data rj, and is then stored in the memory 17. This compressed reference data rj is read in a next frame k (k=j+1).

In the case of performing such processing, data subjected to the compression processing by the data compressing means 13 is constantly stored in the memory 17, and hence a large-capacity memory is not required as the memory 17.

However, according to this processing flow, in every frame j, the reference data generating means 60 generates the reference data Rj of the frame j based on the restored reference data Ri' obtained by performing the expansion processing on the compressed reference data ri obtained by performing the compression processing on the reference data Ri generated in the immediately preceding frame i. Since the restored reference data Ri' is data obtained by performing the compression/expansion processing on the reference data Ri, it includes a compressibility ηi error when compared with the reference data Ri generated in the frame i.

Then, the compressibility error ηi is naturally reflected also to the reference data Rj of the frame j which was generated based on the restored reference data Ri' including this compressibility error ηi. Further, this reference data Rj is subjected to the compression processing by the data compressing means 13 and stored as the compressed reference data rj into the memory 17, and at the time of generating reference data Rk in a next flame k, restored reference data Rj' obtained by performing the expansion processing on this compressed reference data rj is used. That is, the reference data Rk generated in the next frame k includes a compressibility error ηj occurred in the frame j in addition to the compressibility error ηi occurred in the frame i.

In short, according to this image processing method, a later frame has reference data with more accumulated previous compressibility errors. As a result, a large error also occurs in the processed image data generated based on the reference data including a large compressibility error. This causes occurrence of large deterioration in image quality when the display device performs a display based on the processed image data outputted from the processed image data output terminal 23, thereby bringing about the problem of not being able to obtain a desired image.

In view of the above problem, an object of the present invention is to provide an image processing apparatus capable of simultaneous reduction in memory capacity and compressibility error.

Means for Solving the Problem

In order to achieve the above object, an image processing apparatus according to the present invention is characterized by including the following aspects.

Specifically, the apparatus is an image processing apparatus, in which preprocessed image data is inputted in every frame, and subjected to predetermined processing for outputting, and the processed image data is outputted in every frame, the apparatus comprising:

reference data generating means for generating reference data, corresponding to the preprocessed image data inputted in an object frame, one time in one term made up of not less than two consecutive frames, and also outputting, in every frame, specific reference data approximate to the reference data corresponding to the preprocessed image data inputted in the immediately preceding frame;

data compressing means for performing compression processing on the reference data one time in the one term, to generate compressed reference data;

a memory for storing the compressed reference data;

data expanding means for performing expansion processing on the compressed reference data stored in the memory, to generate restored reference data in every frame; and output image data generating means for generating the processed image data based on the specific reference data and the preprocessed image data, wherein the preprocessed image data are data similar to one another over each of at least the number of consecutive frames constituting the term, the reference data generating means is configured to repeatedly execute an identical processing in each term, in the case of the object frame being a top frame in the term, in the object frame, the reference data generating means outputs as the specific reference data the restored reference data generated by the data expanding means based on the compressed reference data stored in the memory, to the output image data generating means, in the case of the object frame being a second or subsequent frame in the term, in the object frame, the reference data generating means generates simulated specific reference data simulated to be the specific reference data on the basis of the restored reference data generated by the data expanding means based on the compressed reference data stored in the memory and the preprocessed image data of the object frame, outputs the simulated specific reference data as the specific reference data to the output image data generating means, and, in the case of the object being a final frame in the term, in addition to the above operation, the reference data generating means generates the reference data based on the specific reference data and the preprocessed image data of the object frame, and outputs the generated data to the data compressing means, and the data compressing means compresses the reference data.

According to this configuration, when an integer N not smaller than 2 is used, performing the compression processing one time in N frames enables reproduction of reference data corresponding to an immediately preceding frame as specific reference data. Hence it is possible to perform the processing for outputting based on this specific reference data and the preprocessed image data inputted in the object frame.

The compressed reference data generated in the final frame in the immediately preceding term is stored in the memory. When the object frame is the top frame in the term, the final frame in this immediately preceding term is just a frame immediately preceding to the object frame. In this case, therefore, it is possible to decide restored reference data, obtained by expanding the compressed reference data, as the specific reference data being approximate to the reference data corresponding to the preprocessed image data inputted in the frame immediately preceding to the object frame.

On the other hand, when the object frame is the second or subsequent frame in the term, the compressed reference data held in the memory is not one generated in the frame immediately preceding to the object frame. Herein used is that, between the consecutive frames, the preprocessed image data to be inputted are approximate to each other. This is understandable when moving image data or 3D video data is assumed.

Then, the preprocessed image data inputted in the object frame can be simulated to be the preprocessed image data inputted in the first frame in the same term. That is, at this time, using this stimulated preprocessed image data and the restored reference data obtained by expanding the compressed reference data, the reference data generating means can simulate the reference data corresponding to the first frame in the same term.

This also applies to a case where the object frame is the third or subsequent frame in the term. The preprocessed image data inputted in the object frame can be simulated to be both the preprocessed image data inputted in the first frame in the same term and the preprocessed image data inputted in the second frame. Accordingly, when simulated data of the reference data corresponding to the first frame is generated by the above method, it is possible to generate simulated data of reference data corresponding to a next frame based on the simulated data of the reference data and the simulated data of the preprocessed image data. Repeating such an operation can lead to generation of simulated data of the reference data corresponding to the frame immediately preceding to the object frame, namely "simulated specific reference data". This simulated specific reference data can be used for performing the processing for outputting in the object frame, along with the preprocessed image data of the object frame.

That is, according to the configuration of the present invention, a compression frequency can be lowered as compared with the conventional configuration, thereby allowing reduction in accumulated amount of compressibility errors associated with performance of the compression/expansion processing. On the other hand, data compressed by the compression processing performed one time in N frames may just be stored in the memory, thus not requiring a large-capacity memory for storing raw data in amount corresponding to one frame.

Therefore, according to the configuration of the present invention, it is possible to simultaneously reduce the memory capacity and the compressibility error.

Further, in addition to the above characteristics, the image processing apparatus of the present invention is characterized by including the following aspects.

Specifically, the apparatus has an aspect that, when the object frame is an a-th (a is an integer not smaller than 2) frame in the term, the reference data generating means is configured that in the case of a=2, in the object frame, first arithmetic processing is performed using the restored reference data generated by the data expanding means and the preprocessed image data of the object frame, and data obtained from the first arithmetic processing is taken as the simulated specific reference data, and in the case of a 3, after execution of the first arithmetic processing, the arithmetic result is re-inputted into the reference data generating means and second arithmetic processing is performed based on the re-inputted data and the preprocessed image data of the object frame, and data, obtained by re-inputting the data obtained in the second arithmetic processing into the reference data generating means as the arithmetic result and repeatedly executing the second arithmetic processing (a-2) times, is taken as the simulated specific reference data.

In addition, the apparatus may be configured such that compression frequency setting information as information regarding the number of consecutive frames constituting the one term is made inputtable from the outside, and the reference data generating means is configured to repeatedly execute a predetermined operation in each term defined by the number of frames represented by the compression frequency setting information.

Effect of the Invention

According to the configuration of the present invention, since data after compressed is constantly stored in the memory, while decreasing the compression frequency, it is possible to simultaneously reduce the memory capacity and the compressibility error.

MODE FOR CARRYING OUT THE INVENTION

Figure 1:
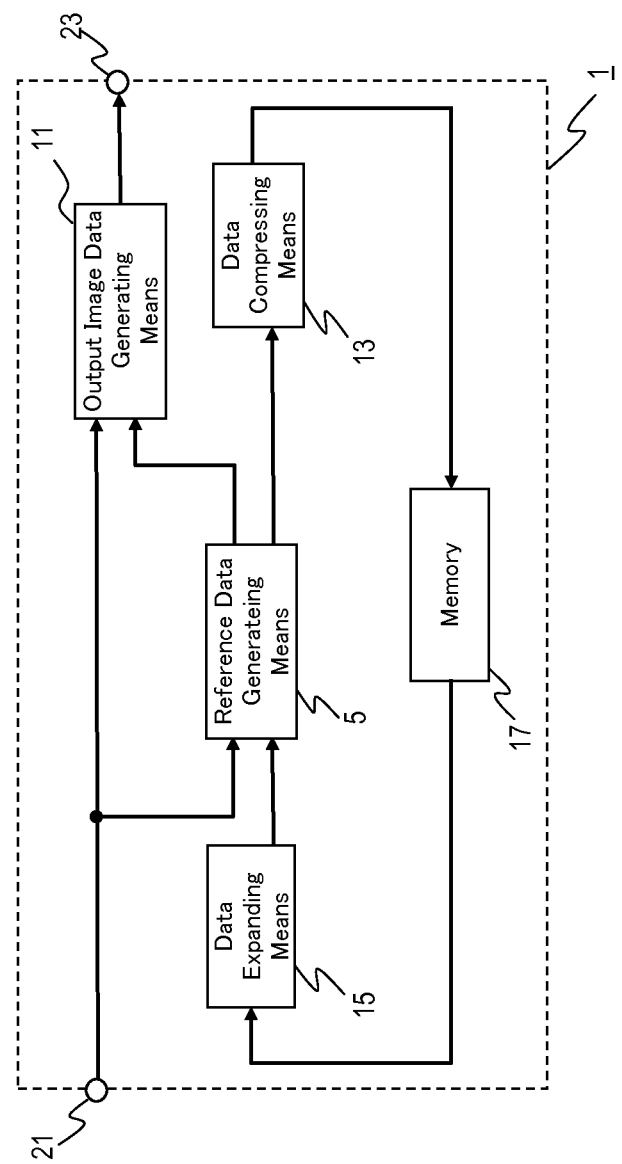
FIG. 1 is a conceptual block diagram of an image processing apparatus of the present invention.

FIG. 1 is a conceptual block diagram of an image processing apparatus according to the present invention. It is to be noted that the same constitutional components as those of FIG. 12 are provided with the same numerals, and detailed descriptions thereof will be omitted.

Figure 12:
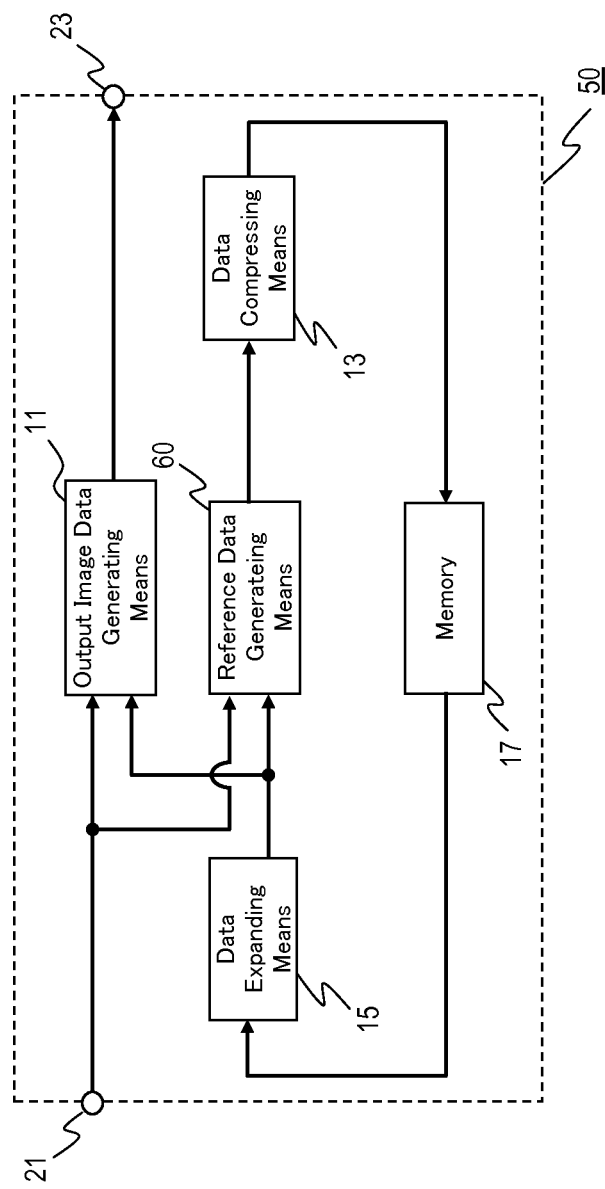
FIG. 12 is a conceptual block diagram of a conventional image processing apparatus.

As is the image processing apparatus 50 of FIG. 12, an image processing apparatus 1 of the present invention is provided with the output image data generating means 11, the data compressing means 13, the data expanding means 15, the memory 17, the preprocessed image data input terminal 21, and the processed image data output terminal 23. The apparatus 1 differs from the image processing apparatus 50 in being provided with reference data generating means 5 in place of the reference data generating means 60.

The image processing apparatus 50 of FIG. 12 has the configuration where data outputted from the data expanding means 15 is transmitted to the output image data generating means 11, whereas the image processing apparatus 1 of the present invention has a configuration where an output of the reference data generating means 5 is transmitted to the output image data generating means 11.

It should be noted that the output image data generating means 11, the data compressing means 13, the data expanding means 15 and the reference data generating means 5 are functional means for executing predetermined arithmetic processing on inputted data by use of hardware (and software, according to the need).

Figure 2:
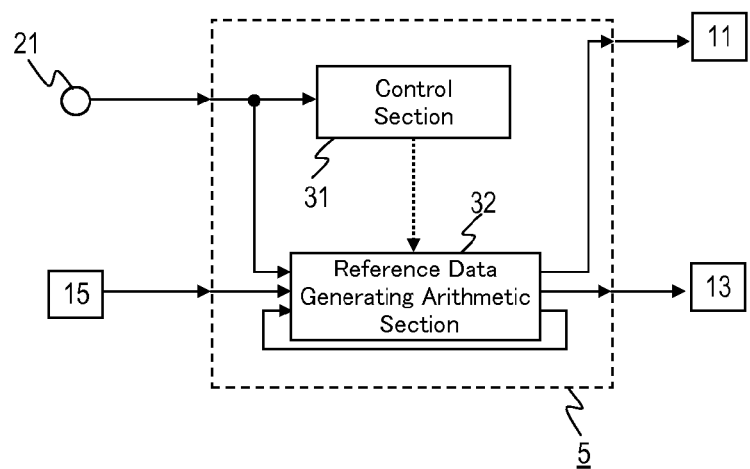
FIG. 2 is a conceptual block diagram of reference data generating means.

Details of the reference data generating means 5 provided in the image processing apparatus 1 will be described with reference to FIG. 2. FIG. 2 is a block diagram showing a conceptual configuration of the reference data generating means 5.

As shown in FIG. 2, the reference data generating means 5 is configured to have a reference data generating arithmetic section 32 for actually performing arithmetic processing to generate reference data based on preprocessed image data provided from the preprocessed image data input terminal 21 and restored reference data provided from the data expanding means 15, and a control section 31 for performing arithmetic control on the reference data generating arithmetic section 32. In addition, although a detail will be described later, the reference data generating arithmetic section 32 re-inputs output data according to the need, to use it for generation of reference data.

The image processing apparatus 1 of the present invention significantly differs from the image processing apparatus 50 of FIG. 12 in that reference data is not compressed by the data compressing means 13 over every frame, but reference data is compressed by the data compressing means 13 one time in each several frames. Even with the configuration as described above, the reference data generating means 5 has characteristics as to make an error from desired processed image data remain in a micro range in processed image data to be outputted from the output image data generating means 11.

Hereinafter, a detail of contents of processing in the image processing apparatus 1 will be described with embodiments

EMBODIMENT 1

Figure 3:
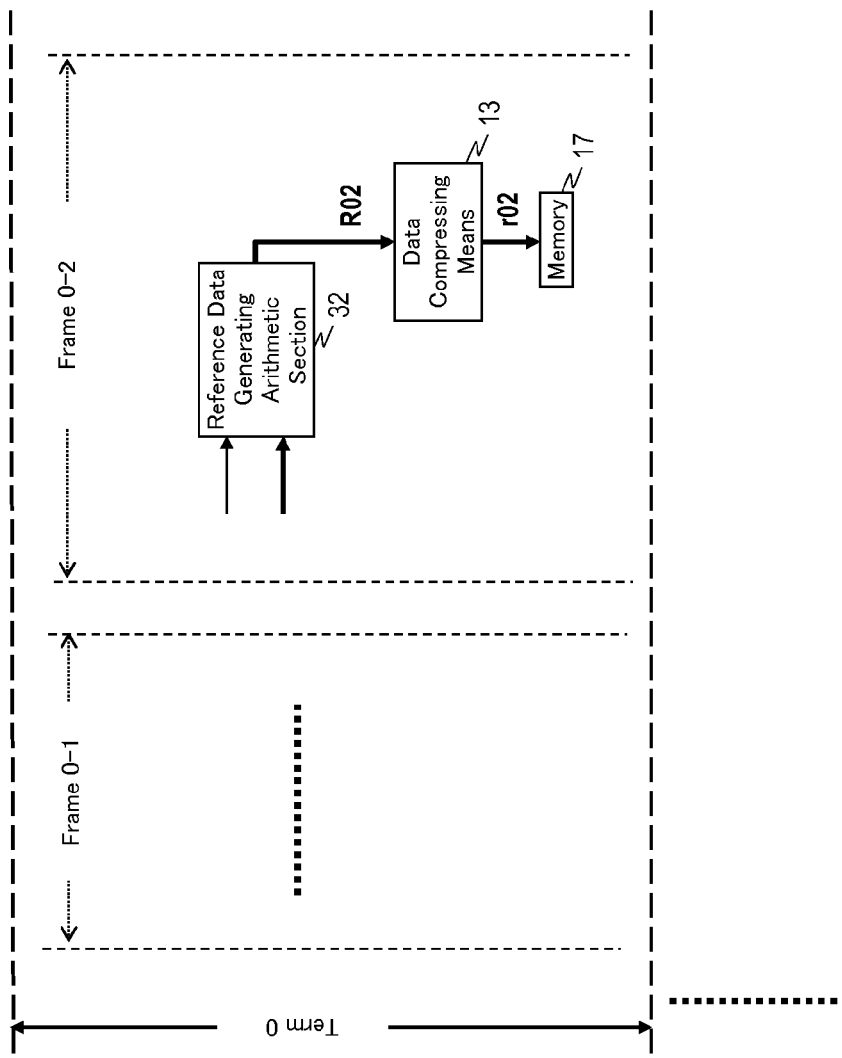
FIG. 3 is a conceptual block diagram showing, in time-series order, contents of processing of an image processing apparatus in Embodiment 1 (No. 1).
Figure 4:
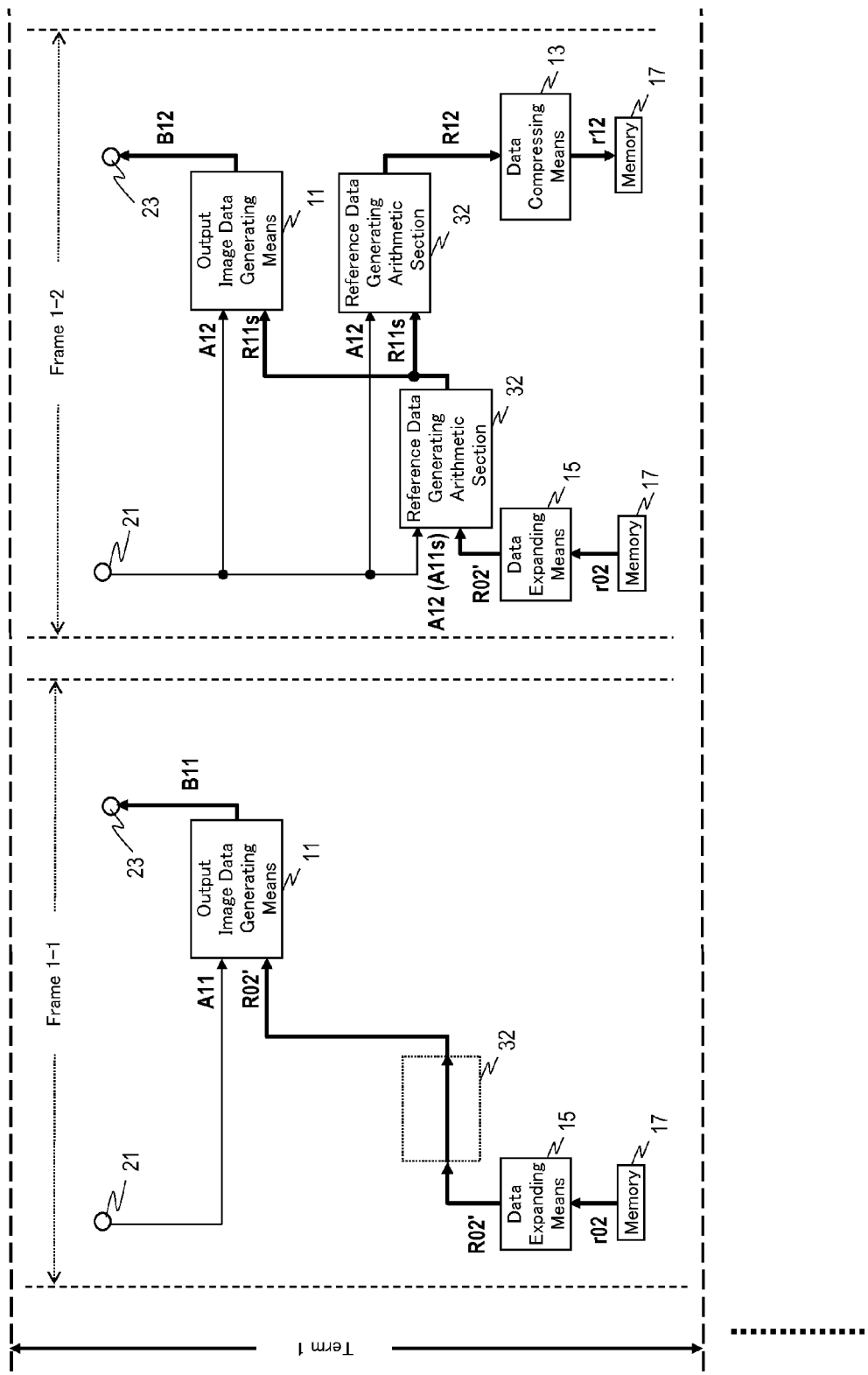
FIG. 4 is a conceptual block diagram showing, in time-series order, contents of processing of an image processing apparatus in Embodiment 1 (No. 2).
Figure 5:
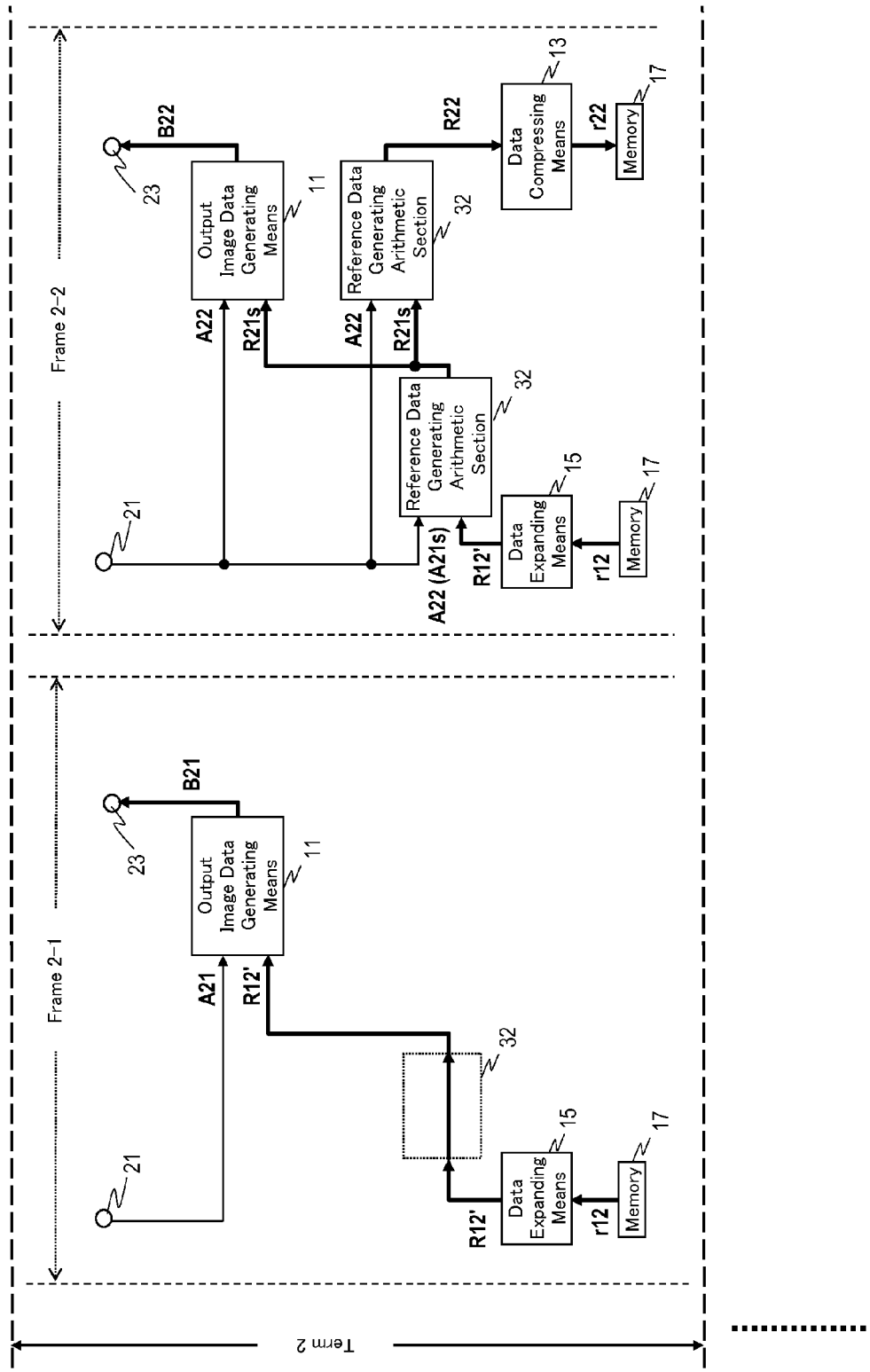
FIG. 5 is a conceptual block diagram showing, in time-series order, contents of processing of an image processing apparatus in Embodiment 1 (No. 3).

First, a case will be described where the image processing apparatus 1 has a configuration that reference data is compressed by the data compressing means 13 one time in two frames. FIGS. 3, 4 and 5 are conceptual diagrams schematically showing, in time-series order, a series of processing performed by the image processing apparatus 1 of the present embodiment. This is illustrated by being divided into three drawings due to space limitations.

It is to be noted that, in the present embodiment, since the present embodiment has an aspect of reference data being compressed by the data compressing means 13 one time in two frames, a description will be made using a concept of a "term" as a unit for these two frames. Further, a term N has two frames, a frame N-1 and a frame N-2.

Moreover, in the present embodiment, a difference is small in preprocessed image data inputted from the preprocessed image data input terminal 21 between two consecutive frames, especially between two consecutive frames in the same term. In the case of normal video data, pixel data in a frame in an arbitrary pixel X is approximate to pixel data in the next frame in the same pixel X, such video data is applied to the case of the difference being small in preprocessed image data between two consecutive frames. Further, also in the case of 3D image data where two left eye images and two right eye images are respectively inputted in an alternate and repeated manner, either data regarding the two right eye images or data regarding the two left eye images are inputted during one term made up of two consecutive frames, and hence this is applied to the case of the difference being small in preprocessed image data between two consecutive frames.

A term 0 shown in FIG. 3 is one illustrated for explaining what data is like, the data being held in the memory 17 at the starting point of the a term 1 (frame 1-1, to be more exact) shown in FIG. 4. Details of contents of an operation in each frame of the term 0 will become apparent by explanation of the terms 1 and 2.

In a latter-half frame 0-2 of the term 0, reference data R02 is generated in the reference data generating arithmetic section 32. This reference data R02 is compressed into compressed reference data r02 in the data compressing means 13, and then stored in the memory 17.

Referring to FIG. 4, an operation in each frame (frames 1-1, 1-2) of the term 1 will be described. As described above, at the starting point of this term 1, the compressed reference data r02 generated in the frame 0-2 of the term 0 is stored in the memory 17.

In the frame 1-1, first, the data expanding means 15 performs expansion processing on the compressed reference data r02 stored in the memory 17, to generate restored reference data R02'. The reference data generating arithmetic section 32 transmits this restored reference data R02' as it is to the output image data generating means 11. The output image data generating means 11 generates processed image data B11 based on preprocessed image data A11 of the present frame 1-1 provided from the preprocessed image data input terminal 21 and the restored reference data R02', to output the generated data from the processed image data output terminal 23.

That is, in the frame 1-1, reference data is not transmitted from the reference data generating arithmetic section 32 to the data compressing means 15, and the data compressing means 15 does not perform the compression processing in this frame. Hence the data stored in the memory 17 is not updated, and the compressed reference data r02 is continuously stored in the memory 17.

In the next frame 1-2, as in the frame 1-1, the data expanding means 15 reads data from the memory 17, to perform the expansion processing. As described above, since the data stored in the memory 17 is not updated in the immediately preceding frame 1-1, the compressed reference data r02 is read from the memory 17 and the restored reference data R02' is generated by the data expanding means 15 as in the frame 1-1. This restored reference data R02' is transmitted to the reference data generating arithmetic section 32.

Differently from the case of the frame 1-1, the reference data generating arithmetic section 32 generates reference data based on preprocessed image data A12 of the present frame 1-2 provided from the preprocessed image data input terminal 21 and the restored reference data R02'. In FIG. 4, the reference data generated at this time is represented as As described above, the preprocessed image data A11 inputted in the frame 1-1 and the preprocessed image data A12 inputted in the frame 1-2 immediately subsequent to the frame 1-1 are almost the same data. Accordingly, when the preprocessed image data A12 is simulated to be the preprocessed image data A11, using this simulated preprocessed image data A11 (it is represented as "A11s" in the drawing so as to be differentiated from the preprocessed image data A11 actually inputted in the frame 1-1) and the restored reference data R02' allows simulation of the reference data R11 that should have originally been generated in the frame 1-1. In the drawing, it is represented as "R11s" using a subscript "s" to indicate the meaning of simulated reference data. Hereinafter, the reference data as thus simulated is referred to as "simulated reference data". Similarly, the simulated preprocessed image data is referred to as "simulated preprocessed image data".

In the frame 1-1, processing for generating the reference data R11 is not performed. This is because, if the reference data R11 is generated in this frame, this reference data R11 needs to be stored in the memory 17 until the next frame 1-2, thus requiring the compression processing in the data compressing means 13. The present embodiment has a configuration where the compression processing is performed by the data compressing means 13 at a rate of one time in two frames. That is, in the present embodiment, the reference data R11 is not generated in the frame 1-1 on purpose so that the data compression processing may not be performed in the frame 1-1.

However, even if the reference data R11 is not generated in the frame 1-1, reference data does not become unnecessary at the time of generating output image data B12 in the next frame 1-2. Then in the frame 1-2, using a property of the preprocessed image data A12 being approximate to the preprocessed image data A11, this data A12 is regarded as A11 (simulated preprocessed image data A11s), and the simulated reference data R11s corresponding to the reference data R11 in the frame 1-1 is generated.

That is, generating the reference data Rj in a frame j requires the reference data Ri generated in the frame i immediately preceding thereto (i=j−1) and preprocessed image data Aj inputted in the frame j. However, it is as described above that, since a large capacity memory is required for holding the reference data Ri itself over one frame, in practice, the compressed reference data ri obtained by compressing the reference data Ri is read from the memory, and the restored reference data Ri' obtained by performing the expansion processing on this read data is used in place of the reference data Ri.

That is, it is found that generating the reference data Rj requires the restored reference data Ri' and the preprocessed image data Aj.

Referring to FIG. 4 again, at the starting point of the frame 1-2, the compressed reference data r02 is stored in the memory 17, and the preprocessed image data A12 is inputted from the preprocessed image data input terminal 21. In the case of regarding the frame 1-1 as a reference, the compressed reference data r02 is the compressed reference data obtained by compressing the reference data generated in the immediately preceding frame, and the preprocessed image data A12 can be regarded as the preprocessed image data A11 inputted in the frame 1-1 since being approximate to this data. Accordingly, in the frame 1-2, data generated by the reference data generating arithmetic section 32 based on the restored reference data R02' obtained by expanding the compressed reference data r02 and the preprocessed image data A12 (simulated preprocessed image data A11s) can be simulated to be the reference data R11 that should have been generated in the frame 1-1 (simulated reference data R11s).

Hence the output image data generating means 11 can generate the processed image data B12 in the present frame 1-2 based on this simulated reference data R11s and the preprocessed image data A12.

Further, as described above, the compression processing is permitted to be performed one time in two frames in the present embodiment. Since the compression processing is not performed in the frame F1, the compression processing is performed in the frame 1-2. Hence in the present frame 1-2, it is possible to generate reference data R12 of the frame 1-2.

Generating the reference data R12 requires the preprocessed image data A12 of the frame 1-2 and the reference data R11 in the immediately preceding frame 1-1. In the present frame 1-2, with the simulated reference data R11s having already been generated in the reference data generating arithmetic section 32, this data can be used. That is, the reference data generating arithmetic section 32 re-inputs thereinto the simulated reference data R11s already generated in the present frame 1-2, to generate the reference data R12 based on this re-inputted data and the preprocessed image data A12. In FIG. 2, an output and an input of the reference data generating arithmetic section 32 are connected so as to schematically show that the data generated in this reference data generating arithmetic section 32 is re-inputted into the reference data generating arithmetic section 32.

This reference data R12 as thus generated is compressed into compressed reference data r12 by the data compressing means 13, and then stored in the memory 17. Thereby, the term 1 is completed.

Subsequent to the term 1, the term 2 is started. In each frame of the term 2 and subsequent terms, similar processing to the frames 1-1 and 1-2 of the term 1 are performed. The term 2 will be briefly described with reference to FIG. 5.

In a first frame 2-1 of the term 2, the reference data generating arithmetic section 32 transmits restored reference data R12', which is based on the compressed reference data r12 stored in the immediately preceding frame 1-2, as it is to the output image data generating means 11. The output image data generating means 11 outputs processed image data B21 based on the restored reference data R12' and preprocessed image data A21 inputted in the present frame 2-1.

In a next frame 2-2, first, the reference data generating arithmetic section 32 generates simulated reference data R21s simulated to be the reference data of the immediately preceding frame 2-1 based on preprocessed image data A22 inputted in the present frame 2-2 (this will become simulated preprocessed image data A21s) and the restored reference data R12'. The output image data generating means 11 generates processed image data B22 based on this simulated reference data R21s and the preprocessed image data A22 to output the generated data. The reference data generating arithmetic section 32 re-inputs thereinto the simulated reference data R21s generated in the immediately preceding frame, and generates reference data R22 of the present frame 2-2 based on this data and the preprocessed image data A22. This reference data R22 is compressed into compressed reference data r22 by the data compressing means 13, and then stored in the memory 17.

Figure 13:
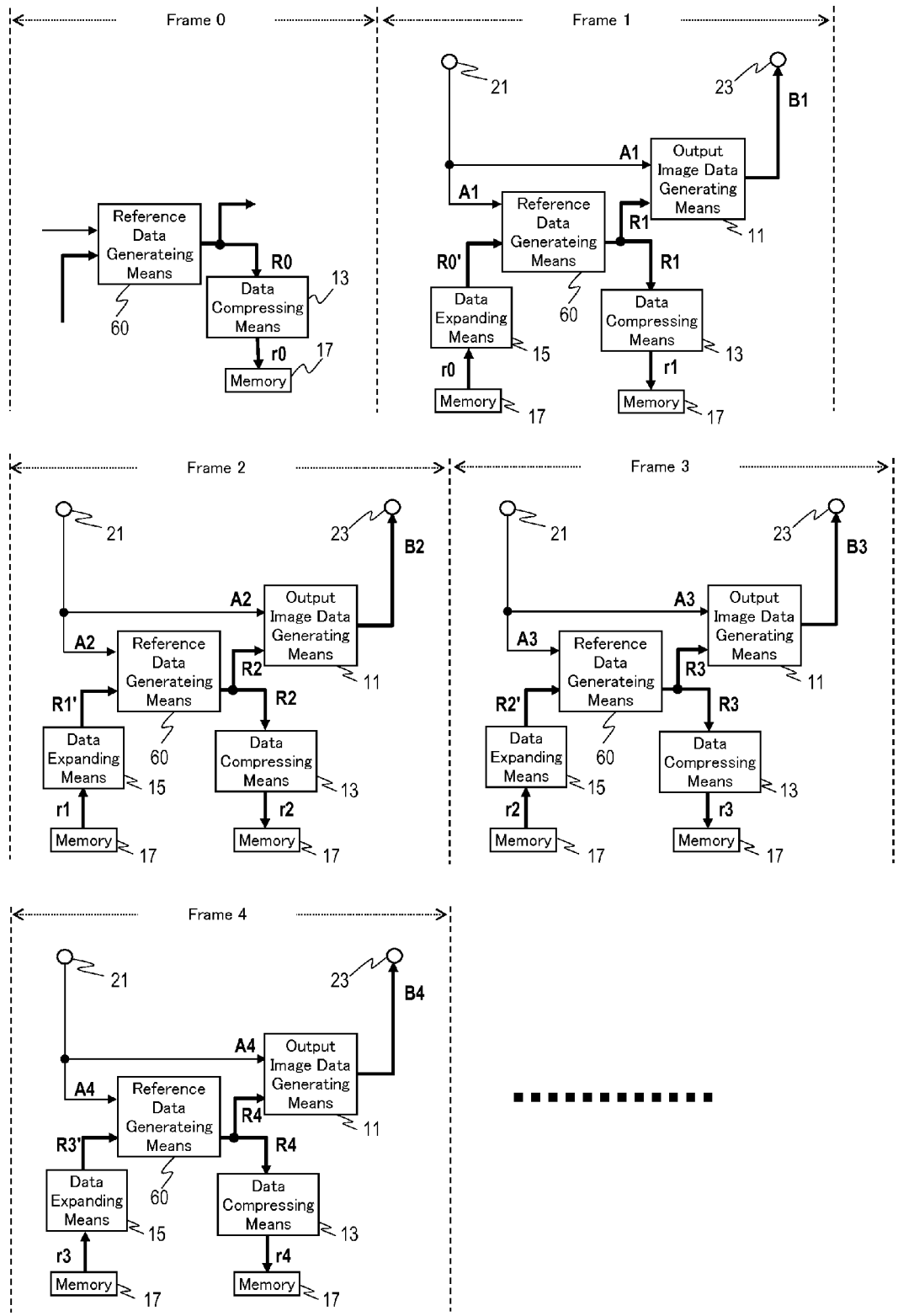
FIG. 13 is a conceptual block diagram showing contents of processing executed by the conventional image processing device.

In the present embodiment, since the compression processing can be reduced to one time in two frames, it is possible to suppress the degree of deterioration in processed image data due to a compressibility error as compared with the conventional processing flow shown in FIG. 13.

EMBODIMENT 2

Next, a case will be described where the image processing apparatus 1 has a configuration that reference data is compressed by the data compressing means 13 one time in four frames. As in Embodiment 1, the unit of repetition is referred to as a "term". In the present embodiment, one term is made up of four frames. FIGS. 6, 7, 8, 9 and 10 are conceptual diagrams schematically showing, in time-series order, a series of processing performed by the image processing apparatus 1 in the present embodiment. This is illustrated by being divided into five drawings due to space limitations.

It is to be noted that, in the present embodiment, reference data is compressed by the data compressing means 13 one time in four frames. As in Embodiment 1, when the concept "term" is used, the "term" is configured by taking four frames as one unit. That is, a term N has four frames, frames N-1, N-2, N-3 and N-4.

Moreover, in the present embodiment, a difference is small in preprocessed image data inputted from the preprocessed image data input terminal 21 among the four consecutive frames in the term. As an example of such preprocessed image data, 3D video data or the like is considered.

Figure 6:
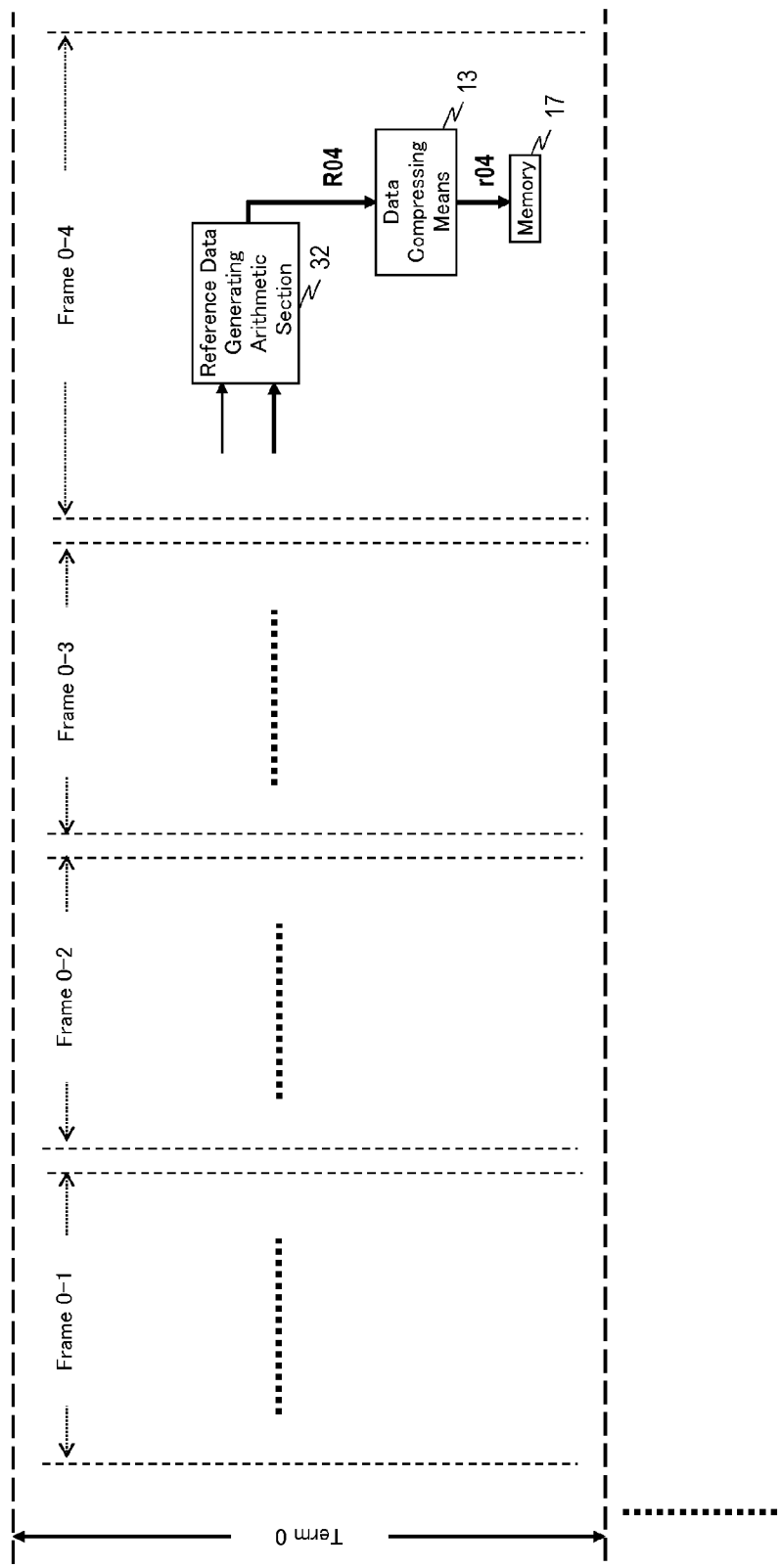
FIG. 6 is a conceptual block diagram showing, in time-series order, contents of processing of an image processing apparatus in Embodiment 2 (No. 1).
Figure 7:
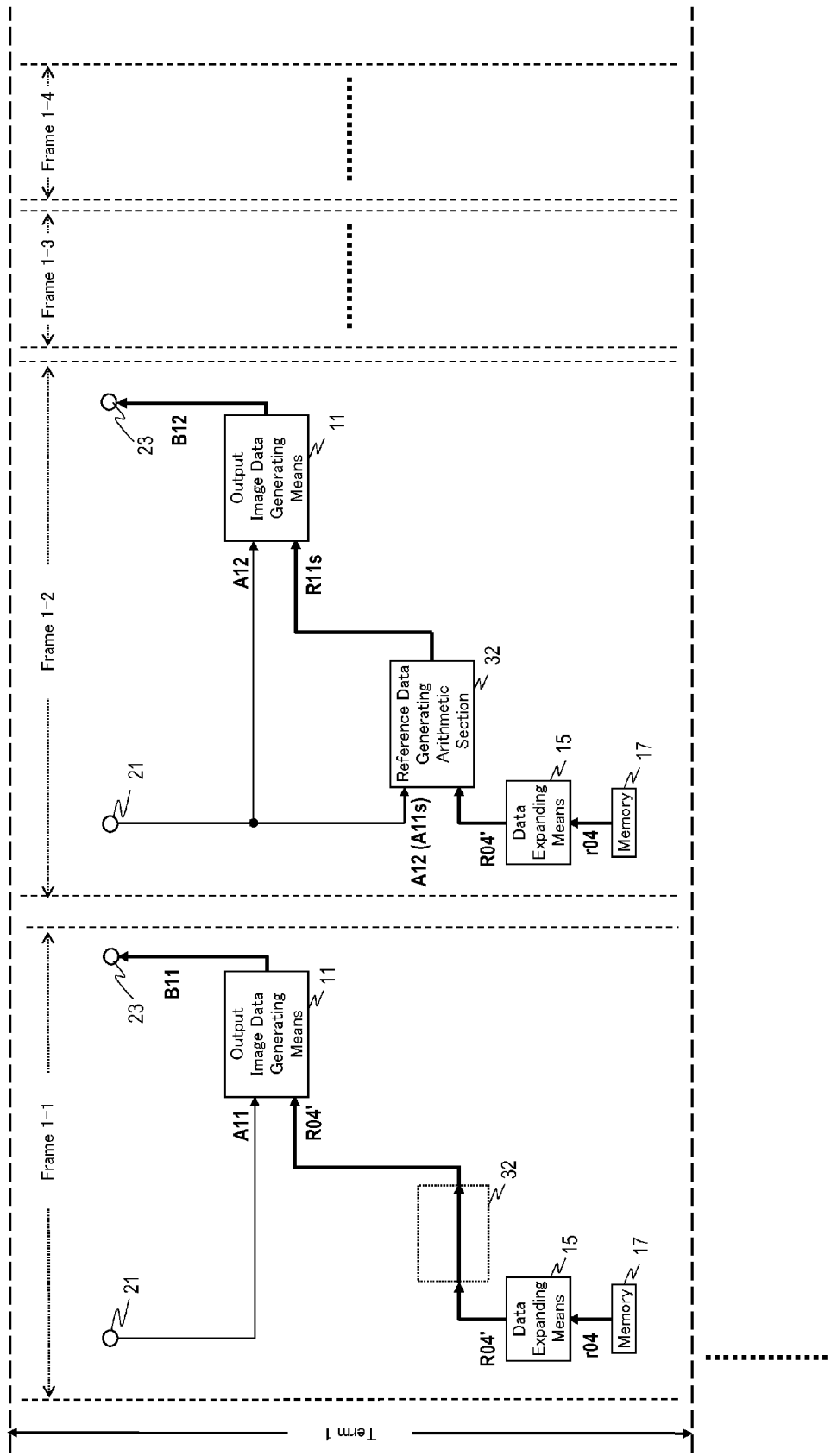
FIG. 7 is a conceptual block diagram showing, in time-series order, contents of processing of an image processing apparatus in Embodiment 2 (No. 2).
Figure 8:
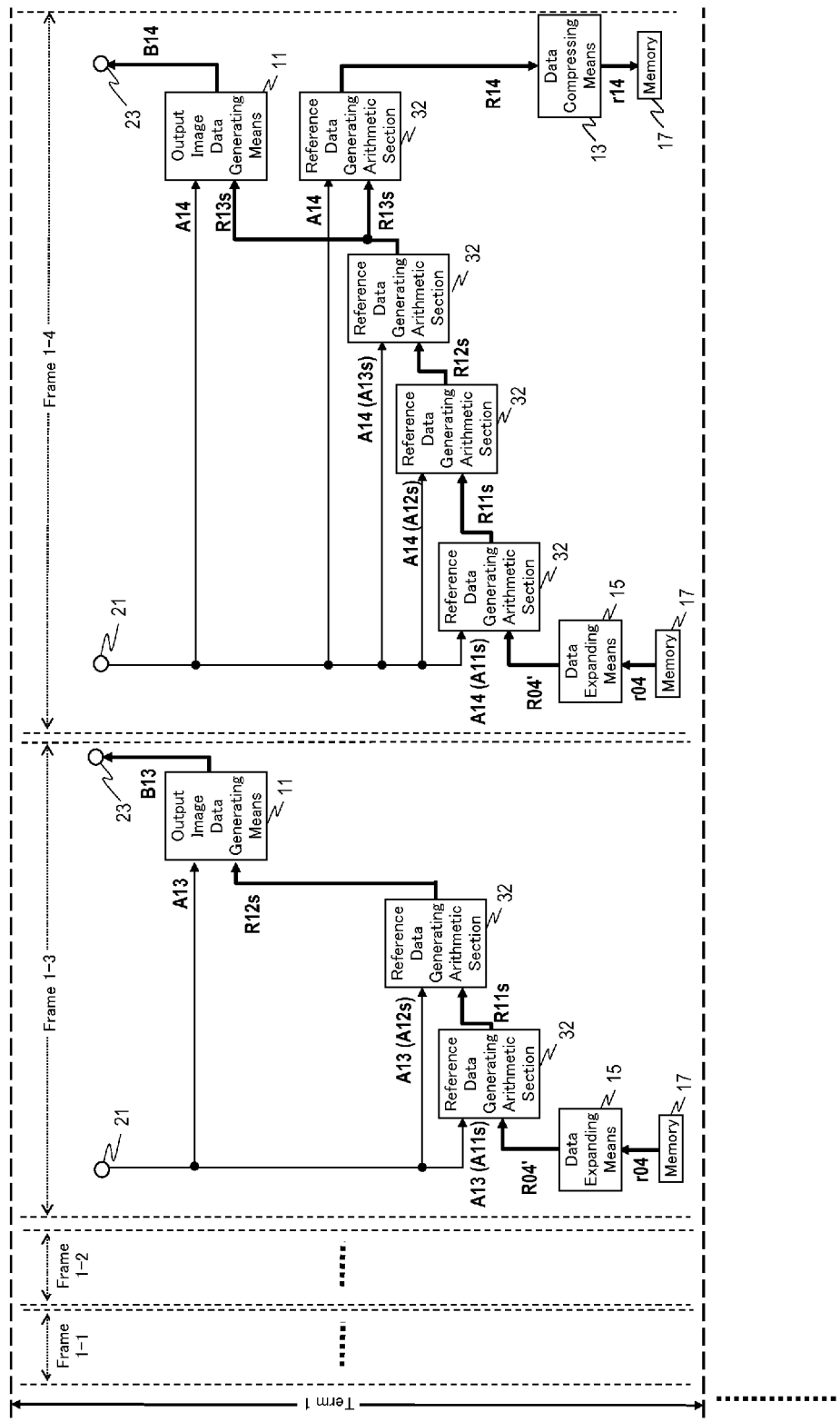
FIG. 8 is a conceptual block diagram showing, in time-series order, contents of processing of an image processing apparatus in Embodiment 2 (No. 3).
Figure 9:
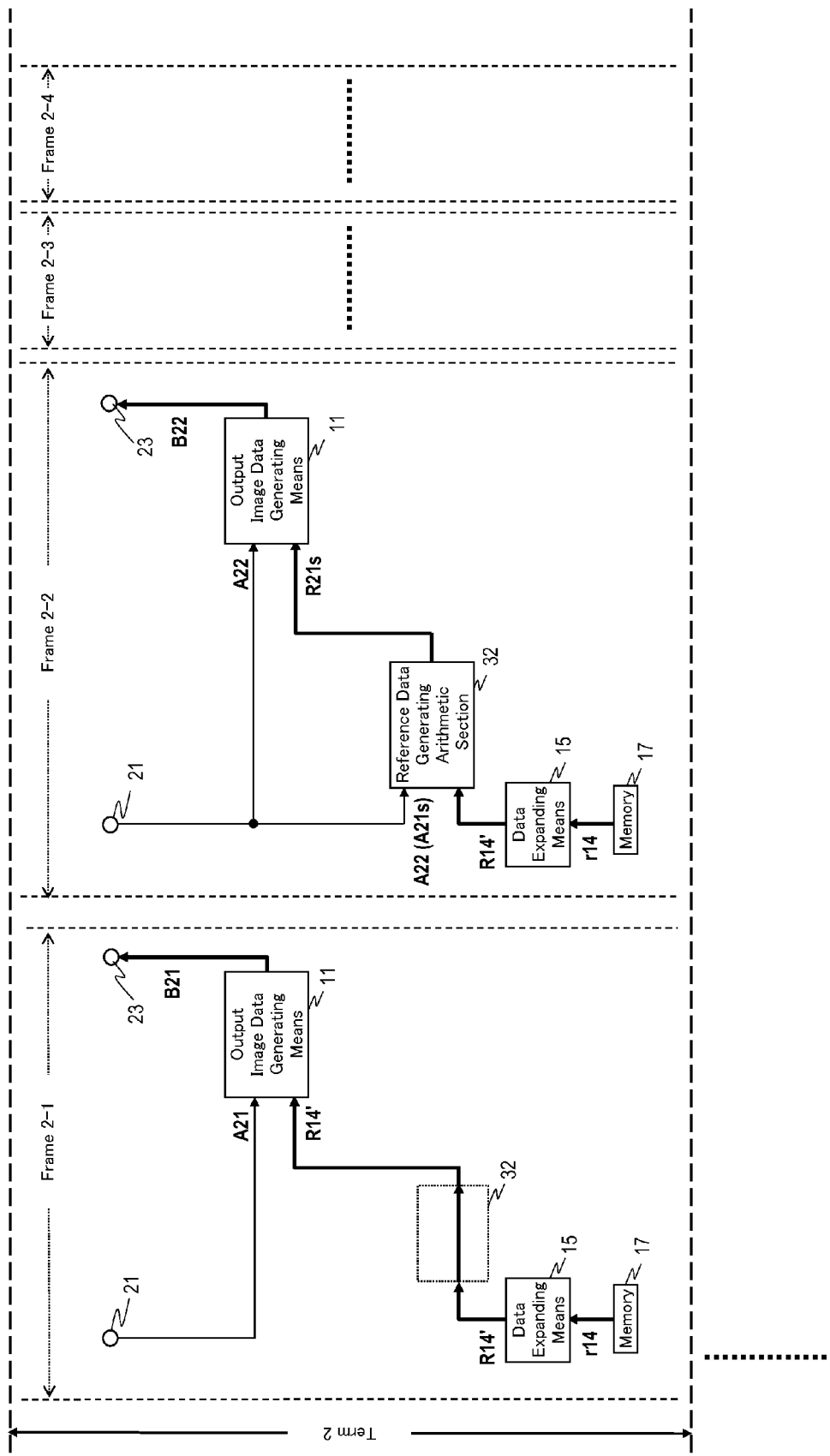
FIG. 9 is a conceptual block diagram showing, in time-series order, contents of processing of an image processing apparatus in Embodiment 2 (No. 4).
Figure 10:
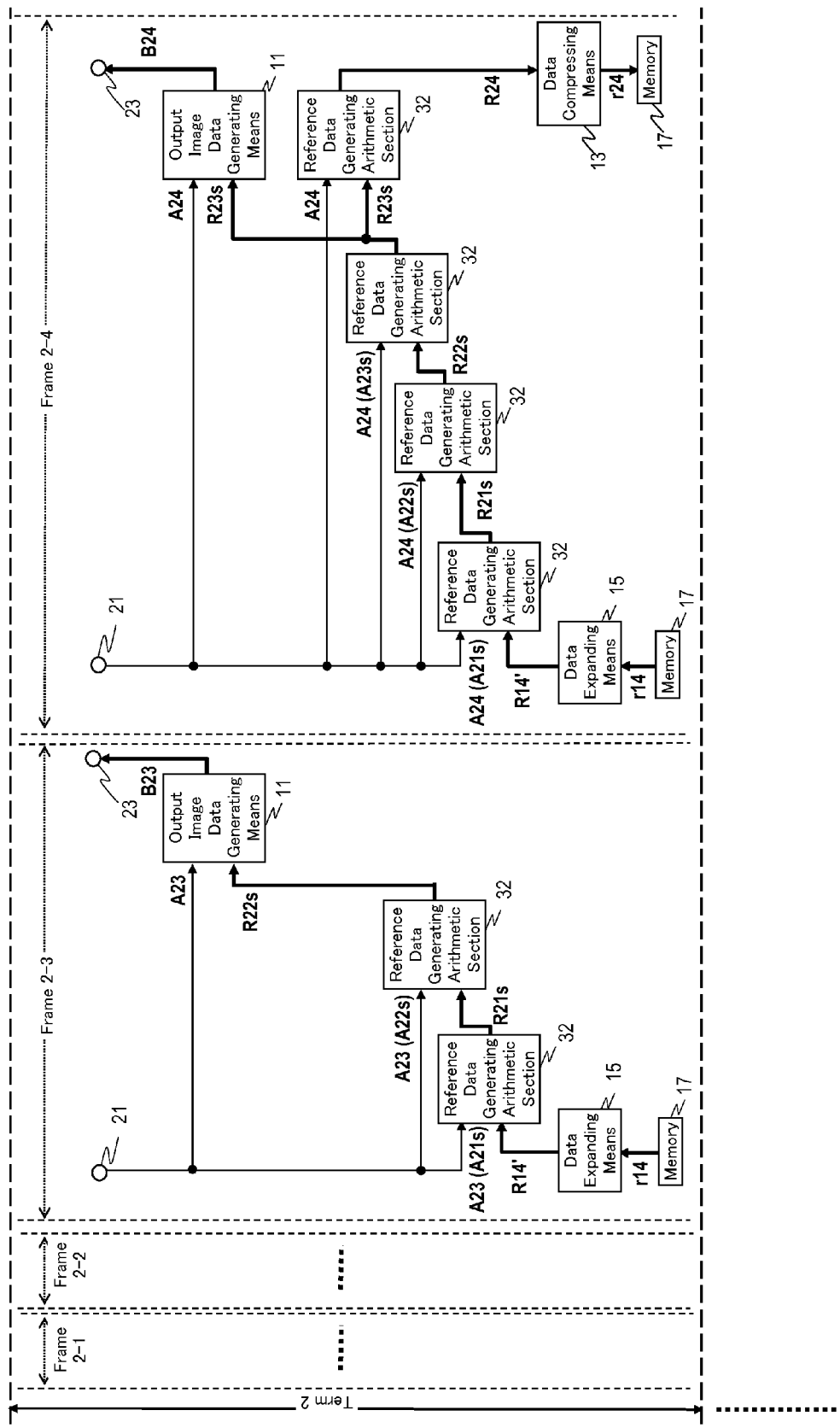
FIG. 10 is a conceptual block diagram showing, in time-series order, contents of processing of an image processing apparatus in Embodiment 2 (No. 5).

A term 0 shown in FIG. 6 is one illustrated for explaining what data is like, the data being held in the memory 17 at the starting point of the a term 1 (frame 1-1, to be more exact) shown in each of FIGS. 7 and 8. Details of contents of an operation in each frame of the term 0 will become apparent by explanation of the terms 1 and 2.

In a final frame 0-4 of the term 0, reference data R04 is generated in the reference data generating arithmetic section 32. This reference data R04 is compressed into compressed reference data r04 by the data compressing means 13, and then stored in the memory 17.

Referring to FIGS. 7 and 8, an operation in each frame (frames 1-1, 1-2, 1-3, 1-4) of the term 1 will be described. As described above, at the starting point of this term 1, the compressed reference data r04 is stored in the memory 17.

In the frame 1-1, the data expanding means 15 performs expansion processing on the compressed reference data r04 stored in the memory 17, to generate restored reference data R04'. As in Embodiment 1, the reference data generating arithmetic section 32 transmits this restored reference data R04' as it is to the output image data generating means 11. The output image data generating means 11 generates processed image data B11 based on preprocessed image data A11 of the present frame 1-1 provided from the preprocessed image data input terminal 21 and the restored reference data R04', to output the generated data from the processed image data output terminal 23.

It is to be noted that, in the present embodiment, with one term being made up of four frames, there exist frames other than an object frame and the frame immediately preceding to the object frame. Hereinafter, when there is a need for describing the frame immediately preceding to the object frame in the same term and a frame preceding thereto while differentiating those frames from each other, an expression "specific" is to be added to a data name. That is, reference data corresponding to the frame immediately preceding to the object frame is referred to particularly as "specific reference data", and data simulated to this specific reference data is referred to as "simulated specific reference data".

In the case of the frame 1-1, the final frame 0-4 of the immediately preceding term 0 as it is corresponds to the immediately preceding frame. For this reason, restored reference data R04' obtained by expanding the generated compressed reference data r04 in the frame 0-4 can be the "specific reference data".

In the next frame 1-2, as in the frame 1-1, the data expanding means 15 reads data from the memory 17 to perform expansion processing. Since the data stored in the memory 17 is not updated in the immediately preceding frame 1-1, the compressed reference data r04 is read from the memory 17 and restored reference data R04' is generated by the data expanding means 15 as in the frame 1-1. This restored reference data R04' is transmitted to the reference data generating arithmetic section 32.

The reference data generating arithmetic section 32 simulates preprocessed image data A12 of the present frame 1-2, which is provided from the preprocessed image data input terminal 21, to be the preprocessed image data A11 of the immediately preceding frame 1-1 (simulated preprocessed image data A11s), to generate reference data based on this simulated data and the restored reference data R04'. As described above in Embodiment 1, this reference data is one simulated to be the reference data R11 that should have been generated in the immediately preceding frame 1-1 (simulated reference data R11s, and this is also simulated specific reference data). Then, the output image data generating means 11 generates processed image data B12 in the present frame 1-2 based on this simulated reference data R11s and the preprocessed image data A12, and outputs the generated data from the processed image data output terminal 23.

Moving to FIG. 8, in the next frame 1-3, as in the frame 1-1, the data expanding means 15 first reads data from the memory 17 to perform expansion processing. Since the data stored in the memory 17 is not updated in the immediately preceding frame 1-2, the compressed reference data r04 is read from the memory 17 and restored reference data R04' is generated in the data expanding means 15 as in the frame 1-2. This restored reference data R04' is transmitted to the reference data generating arithmetic section 32.

The reference data generating arithmetic section 32 simulates preprocessed image data A13 of the present frame 1-3, which is provided from the preprocessed image data input terminal 21, to be the preprocessed image data A11 of the two-frame preceding frame 1-1 (simulated preprocessed image data A11s), to generate reference data based on this data and the restored reference data R04'. For a similar reason to the frame 1-2, this reference data is one simulated to be the reference data R11 that should have been generated in the frame 1-1 (simulated reference data R11s). However, since the frame 1-1 is not a frame immediately preceding to the object frame 1-3, the simulated reference data fills is not the simulated specific reference data. Accordingly, in order to generate the simulated specific reference data, this simulated reference data R11s is re-inputted into the reference data generating arithmetic section 32 to execute arithmetic processing.

That is, the reference data generating arithmetic section 32 simulates the preprocessed image data A13 of the present frame 1-3 to be the preprocessed image data A12 of the immediately preceding frame 1-2 (simulated preprocessed image data A12s), and re-inputs the generated simulated reference data R11s, to regenerate reference data. This reference data is one simulated to be the reference data R12 that should have been generated in the frame 1-2 (simulated reference data R12s). Since this simulated specific reference data R12s corresponds to the frame 1-2 immediately preceding to the object frame 1-3, it is the simulated specific reference data. The reference data generating arithmetic section 32 thus outputs this data to the output image data generating means 11.

The output image data generating means 11 generates processed image data B13 in the present frame 1-3 based on this simulated reference data R12s (also being the simulated specific reference data) and the preprocessed image data A13, and outputs the generated data from the processed image data output terminal 23.

In the next frame 1-4, as in the frame 1-1, the data expanding means 15 first reads data from the memory 17 to perform expansion processing. Since the data stored in the memory 17 is not updated in the immediately preceding frame 1-3, the compressed reference data r04 is read from the memory 17 and restored reference data R04' is generated by the data expanding means 15 as in the frame 1-3. This restored reference data R04' is transmitted to the reference data generating arithmetic section 32.

The reference data generating arithmetic section 32 simulates preprocessed image data A14 of the present frame 1-4, which is provided from the preprocessed image data input terminal 21, to be the preprocessed image data A11 of the three-frame preceding frame 1-1 (simulated preprocessed image data Ails), to generate reference data based on this data and the restored reference data R04'. For a similar reason to the frame 1-3, this reference data is one simulated to be the reference data R11 that should have been generated in the frame 1-1 (simulated reference data R11s). However, since the frame 1-1 is not a frame immediately preceding to the object frame 1-4, the simulated reference data R11s is not the simulated specific reference data. Accordingly, in order to generate the simulated specific reference data, this simulated reference data R11s is re-inputted into the reference data generating arithmetic section 32 to execute arithmetic processing.

Further, the reference data generating arithmetic section 32 simulates the preprocessed image data A14 of the present frame 1-4 to be the preprocessed image data A12 of the two-frame preceding frame 1-2 (simulated preprocessed image data A12s), and re-inputs the generated simulated reference data R11s, to regenerate reference data. For a similar reason to the frame 1-3, this reference data is one simulated to be the reference data R12 that should have been generated in the frame 1-2 (simulated reference data R12s). However, the frame 1-2 is not a frame immediately preceding to the object frame 1-4, either, and hence the simulated reference data R12s is not the simulated specific reference data. Accordingly, in order to generate the simulated specific reference data, this simulated reference data R12s is re-inputted into the reference data generating arithmetic section 32, to execute arithmetic processing.

Further, the reference data generating arithmetic section 32 simulates the preprocessed image data A14 of the present frame 1-4 to be the preprocessed image data A13 of the immediately preceding frame 1-3 (simulated preprocessed image data A13s), and re-inputs the generated simulated reference data R12s, to regenerate reference data. This reference data is one simulated to be the reference data R13 that should have been generated in the frame 1-3 (simulated reference data R13s). Since this simulated reference data R13s corresponds to the frame 1-3 immediately preceding to the object frame 1-4, it is the simulated specific reference data. The reference data generating arithmetic section 32 thus outputs this data to the output image data generating means 11.

The output image data generating means 11 generates processed image data B14 in the present frame 1-4 based on this simulated reference data R13s (also being the simulated specific reference data) and the preprocessed image data A14, and outputs the generated data from the processed image data output terminal 23.

Further, as described above, the compression processing is permitted to be performed one time in four frames in the present embodiment. Since the compression processing is not performed in the frames 1-1, 1-2 and 1-3, but performed in the frame 1-4. Hence in the present frame 1-4, it is possible to generate the reference data R14 of the frame 1-4.

Generating the reference data R14 requires the preprocessed image data A14 of the frame 1-4 and the reference data R13 (specific reference data) in the immediately preceding frame 1-3. In the present frame 1-4, with the simulated reference data R13s (simulated specific reference data) having already been generated in the reference data generating arithmetic section 32, this data can be used. That is, the reference data generating arithmetic section 32 re-inputs thereinto the simulated reference data R13s already generated in the present frame 1-2, to generate the reference data R14 based on this data and the preprocessed image data A14.

This reference data R14 as thus generated is compressed into compressed reference data r14 by the data compressing means 13, and then stored in the memory 17. Thereby, the term 1 is completed.

Subsequent to the term 1, the term 2 is started. In each frame of the term 2 and subsequent terms, similar processing to the frames 1-1, 1-2, 1-3 and 1-4 of the term 1 are performed. The term 2 will be briefly described with reference to FIGS. 9 and 10.

In a first frame 2-1 of the term 2, the reference data generating arithmetic section 32 transmits restored reference data R14', which is based on the compressed reference data r14 stored in the immediately preceding frame 1-4, as it is to the output image data generating means 11. The output image data generating means 11 outputs processed image data B21 based on the restored reference data R14' and preprocessed image data A21 inputted in the present frame 2-1.

In a next frame 2-2, first, the reference data generating arithmetic section 32 generates simulated reference data R21s (simulated specific reference data) simulated to be the reference data of the immediately preceding frame 2-1 based on preprocessed image data A22 inputted in the present frame 2-2 (simulated preprocessed image data A21s) and the restored reference data R14'. The output image data generating means 11 generates processed image data B22 based on this simulated reference data R21s (simulated specific reference data) and the preprocessed image data A22.

In a next frame 2-3, first, the reference data generating arithmetic section 32 generates simulated reference data R21s simulated to be the reference data of the two-frame preceding frame 2-1 based on preprocessed image data A23 (simulated preprocessed image data A21s) inputted in the present frame 2-3 and the restored reference data R14'. Further, the reference data generating arithmetic section 32 re-inputs thereinto this generated simulated reference data R21s, and based on this data and preprocessed image data A23 (simulated preprocessed image data A22s) inputted in the present frame 2-3, the reference data generating arithmetic section 32 generates simulated reference data R22s (simulated specific reference data) simulated to the reference data of the immediately preceding frame 2-2. The output image data generating means 11 generates processed image data B23 based on the simulated reference data R22s (simulated specific reference data) and the preprocessed image data A23.

In a next frame 2-4, first, the reference data generating arithmetic section 32 generates simulated reference data R21s simulated to be the reference data of the three-frame preceding frame 2-1 based on preprocessed image data A24 (simulated preprocessed image data A21s) inputted in the present frame 2-4 and the restored reference data R14'. Further, the reference data generating arithmetic section 32 re-inputs thereinto this generated simulated reference data R21s, and based on this data and preprocessed image data A24 (simulated preprocessed image data A22s) inputted in the present frame 2-4, the reference data generating arithmetic section 32 generates simulated reference data R22s simulated to the reference data of the two-frame preceding frame 2-2. Further, the reference data generating arithmetic section 32 re-inputs thereinto this generated simulated reference data R22s, and based on this data and preprocessed image data A24 (simulated preprocessed image data A23s) inputted in the present frame 2-4, the reference data generating arithmetic section 32 generates simulated reference data R23s (simulated specific reference data) simulated to the reference data of the immediately preceding frame 2-3. The output image data generating means 11 generates processed image data B24 based on this simulated reference data R23s and the preprocessed image data A24.

Then in the frame 2-4, the reference data generating arithmetic section 32 re-inputs thereinto the simulated reference data R23s (simulated specific reference data) generated in the immediately preceding frame, and generates reference data R24 of the present frame 2-4 based on this generated data and the preprocessed image data A24. This reference data R24 is compressed into compressed reference data r24 in the data compressing means 13, and then stored in the memory 17.

In the present embodiment, since the compression processing can be reduced to one time in four frames, it is possible to suppress the degree of deterioration in processed image data due to a compressibility error as compared with the conventional processing flow shown in FIG. 13. Further, since the number of times of the compression processing can be made smaller than in Embodiment 1, it is possible to expect a higher effect on suppression of deterioration than in Embodiment 1.

In the light of Embodiments 1 and 2 above, the image processing apparatus 1 of the present invention can generate processed image data for outputting based on reference data generated in an immediately preceding frame by one compression processing in N frames, by use of an integer N not smaller than 2. Hereinafter, contents of processing in the image processing apparatus 1 will be generalized and described.

In the description, an a-th frame belonging to a term T is symbolized as a frame F_[T,a]. Further, data a generated in this frame is symbolized as data a[T,a]. Moreover, in the case of particularly indicating that data α is simulated data, a subscript "s" is added to a symbol.

Using this symbolization method, a specific embodiment will be described. A third frame F_[1,3] belonging to the term 1 corresponds to the frame 1-3 of FIG. 8 in Embodiment 2. Further, processed image data B[1,3] generated in this frame corresponds to the processed image data B13 in FIG. 8. Moreover, preprocessed image data A[1,3] inputted in this frame is used in generation of simulated reference data R[1,1]s as simulated preprocessed image data A[1,1]s simulated to be preprocessed image data inputted in a two-frame preceding frame F_[1,1], and is further used in generation of simulated reference data R[1,2]s as simulated preprocessed image data A[1,2]s simulated to be preprocessed image data inputted in an immediately preceding frame F_[1,2].

The image processing apparatus 1 of the present invention performs data compression processing at a rate of one time in N frames (N is an integer of N≥2). When consecutive N frames are defined as one term, data compression processing is performed at a rate of one time in one term. A frame subsequent to a frame where the compression processing is performed, the term is shifted to a next term.

At the starting point of each frame belonging to each term T except the first term (corresponding to the term 0 in Examples), compressed reference data r[(T−1),N] of a final frame F_[(T−1),N] of an immediately preceding term is stored in the memory 17.

In a frame F_[T,a] of an arbitrary a-th (a is an integer not smaller than 1 and not larger than N) of the term T, the data expanding means 15 generates restored reference data R'[(T−1),N] based on the compressed reference data r[(T−1),N] stored in the memory, to be outputted to the reference data generating arithmetic section 32.

Further, in the case of a=1, namely, in the first frame F_[T,1] of the term T, the reference data generating arithmetic section 32 outputs the restored reference data R'[(T−1),N] as it is to the output image data generating means 11. The output image data generating means 11 generates processed image data B[T,1] based on preprocessed image data A[T,1] inputted from the preprocessed image data input terminal 21 and the restored reference data R'[(T−1),N], and outputs the generated data.

In the case of a>1, namely, in the frame F_[T,a] of the term T except the first one, the reference data generating arithmetic section 32 generates simulated reference data R[T,1]s of the first frame F_[T,1] of the term T based on the restored reference data R'[(T−1),N] and the preprocessed image data A[T,a]. In the case of a=2 (including a=N in the case of N=2), the output image data generating means 11 generates processed image data B[T,2] based on preprocessed image data A[T,2] inputted from the preprocessed image data input terminal 21 and this simulated reference data R[T,1]s, and outputs the generated data.

Further in the case of a>2, an operation of re-inputting the simulated reference data generated in the reference data generating arithmetic section 32 into the reference data generating arithmetic section 32 and regenerating simulated reference data based on this generated data and the preprocessed image data A[T,a] is further repeatedly executed (a-2) times, to generate simulated reference data (simulated specific reference data) R[T,(a−1)]s of the immediately preceding frame. Then, the output image data generating means 11 generates processed image data B[T,a] based on preprocessed image data A[T,a] inputted from the preprocessed image data input terminal 21 and this simulated reference data (simulated specific reference data) R[T,(a−1)]s of the immediately preceding frame, and outputs the generated data.

Moreover in the case of a=N, namely in the case of the final frame of the term T, the simulated reference data (simulated specific reference data) R[T,(a−1)]s of the immediately preceding frame, generated in the reference data generating arithmetic section 32, is re-inputted into the reference data generating arithmetic section 32, and reference data R[T,N] of the frame F_[T,N] is generated based on this data and the preprocessed image data A[T,N]. This reference data R[T,N] is subjected to compression processing by the data compressing means 13, and stored as compressed reference data r[T,N] into the memory 17.

Another Embodiment

Hereinafter, another embodiment will be described.

<1> In the above embodiments, a detail of contents of the arithmetic operation actually performed by the output image data generating means 11 has not particularly been defined. The image processing apparatus of the present invention is applicable to any processing mechanism that performs processing for calculating necessary data by use of image data of an object frame and data based on image data of an immediately preceding frame (this corresponds to "reference data").

Examples of a specific aspect to use the image processing apparatus of the present invention include a decision mechanism of an applied voltage to a pixel electrode of a liquid crystal display device. Since a response speed of a transmittance of a liquid crystal is slower than a change of the applied voltage to the pixel electrode, there may be considered cases where a display image cannot efficiently respond to a quick change of input image data.

It is hence assumed that, when an output value of image data of the object frame increasingly changes as compared with image data in the immediately preceding frame, data larger than the inputted image data is outputted as processed image data, and on the contrary, when an output value of image data of the object frame decreasingly changes as compared with image data in the immediately preceding frame, data smaller than the inputted image data is outputted as processed image data (overshoot processing). This allows improvement in response characteristics of the liquid crystal display device.

When such overshoot processing is performed in conventional processing order shown in FIGS. 12 and 13, it is considered that compressibility errors are superimposed over time, resulting in occurrence of deterioration in image quality and a phenomenon of display of a bright point/bright line. According to the processing flow of the image processing apparatus of the present invention, the compressibility error can be suppressed, thereby to allow display of a high-quality image.

Other than the above, the image processing apparatus of the present invention can be used also in the case of performing correction processing based on image data of the immediately preceding frame.

<2> The processing flow of the reference data generating means 5 described with reference FIGS. 3 to 10 may be configured to be realized by the reference data generating arithmetic section 32 being controlled based on a control signal by the control section 31. Herein, from apparent in FIGS. 3 to 10, this is a configuration where substantial contents of the operation of the reference data generating means 5 change depending on what number of frame it belongs to in each term. For this reason, a configuration may be formed where the control section 31 previously recognizes the number of frames included in each term, and further recognizes the turn of the frames based on data provided from the preprocessed image data input terminal 21, thereby to recognize what number of frames it belongs to in the term.

Moreover, especially when one term is made up of two frames as in Embodiment 1, only switching between the operation (operation 1) shown in the frame 1-1 and the operation (operation 2) shown in the frame 1-2 in FIG. 4 may be performed, and a configuration can be formed where contents of those operations are previously stored, and a signal indicating switching the contents of the operation is outputted to the reference data generating arithmetic section 32 at the time of recognizing the turn of the frames.

It is to be noted that as a method for recognizing the turn of the frames, there can be used a method where a flag indicating switching of a frame is previously inserted at the top or the last of preprocessed image data for one frame, and the control section 31 recognizes the turn at the time of recognizing this flag. Further, as another method, there may be a method where a synchronous signal is inputted from the outside into the control section 31 at the time of switching between the frames.

Moreover, when one term is made up of not less than three frames as in Embodiment 2, a mechanism for counting frames may just be provided in the control section 31. In this case, the counting mechanism may have a configuration where the count is cleared to 0 in every number of frames constituting the term. For example, when one term is made up of four frames as in Embodiment 2, at least four may just be counted.

<3> In the first term 0, since there exists no immediately preceding frame, compressed reference data generated in the immediately preceding frame is not stored in the memory. For this reason, predetermined data is previously stored in the memory 17 in the first term 0, and based on this generated data, reference data can be generated.

Figure 11:
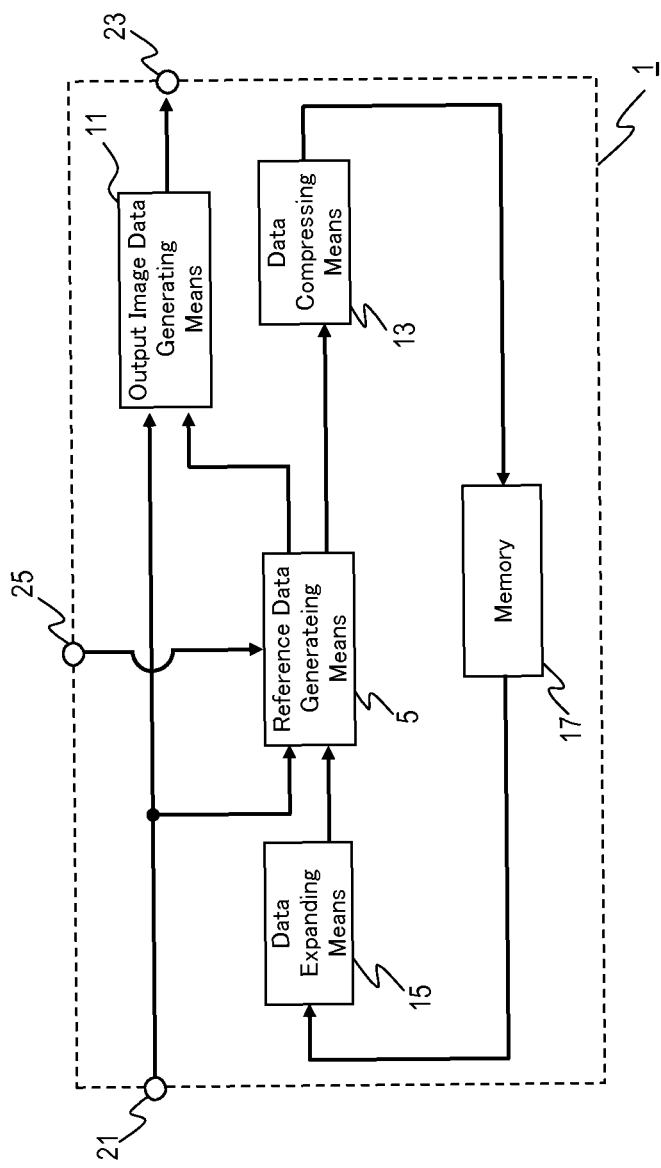
FIG. 11 is another conceptual block diagram of the image processing apparatus of the present invention.

<4> A configuration may be formed where the number N of frames included in a term can be specified from the outside. For example, a configuration is formed, as shown in FIG. 11, where the image processing apparatus 1 is provided with a compression frequency set terminal 25, and information regarding the frame number N can be inputted from the compression frequency set terminal 25. When being given this information, the reference data generating means 5 executes compression processing one time in N frames. The timing for changing this value N can be the timing when the term switches.

EXPLANATION OF REFERENCES

1: image processing apparatus of the present invention
5: reference data generating means
11: output image data generating means
13: data compressing means
15: data expanding means
17: memory
21: preprocessed image data input terminal
23: processed image data output terminal 25: compression frequency set terminal
31: control section
32: reference data generating arithmetic section
50: conventional image processing apparatus
60: reference data generating means provided in the conventional image processing apparatus

The invention claimed is:

1. An image processing apparatus, in which preprocessed image data is inputted in every frame, and subjected to predetermined processing for outputting, and the processed image data is outputted in every frame, the apparatus comprising:
reference data generating means for generating reference data one time in one term made up of not less than two consecutive frames, and also outputting specific reference data in every frame;
data compressing means for performing compression processing on the reference data one time in the one term, to generate compressed reference data;
a memory for storing the compressed reference data;
data expanding means for performing expansion processing on the compressed reference data stored in the memory, to generate restored reference data in every frame; and
output image data generating means for generating the processed image data based on the specific reference data and the preprocessed image data,
wherein
the reference data generating means is configured to repeatedly execute the same processing in each term,
in a first frame in the term the reference data generating means outputs as the specific reference data the restored reference data generated by the data expanding means based on the compressed reference data stored in the memory, to the output image data generating means,
in an intermediate frame other than the first frame and a final frame in the term, the reference data generating means outputs the specific reference data generated on the basis of the restored reference data generated by the data expanding means based on the compressed reference data stored in the memory and the preprocessed image data of the intermediate frame, to the output image data generating means, and,
in the final frame in the term, the reference data generating means outputs the specific reference data generated on the basis of the restored reference data generated by the data expanding means based on the compressed reference data stored in the memory and the preprocessed image data of the final frame, to the output image data generating means, and also generates the reference data based on the specific reference data and the preprocessed image data of the final frame, to output the generated data to the data compressing means, and the data compressing means compresses the reference data.

2. The image processing apparatus according to claim 1, wherein,
in an a-th (a is an integer not smaller than 2) frame in the term,
in the case of a=2, the reference data generating means performs first arithmetic processing by use of the restored reference data generated by the data expanding means and the preprocessed image data takes an arithmetic result obtained as the specific reference data, and
in the case of a≥3, after execution of the first arithmetic processing, the reference data generating means takes as the specific reference data an arithmetic result, obtained by repeatedly executing second arithmetic processing (a-2) times based on the preprocessed image data and the arithmetic result obtained by immediately preceding arithmetic processing.

3. The image processing apparatus according to claim 2, wherein
the apparatus is configured that compression frequency setting information as information regarding the number of consecutive frames constituting the one term is made inputtable from the outside, and
the reference data generating means is configured to repeatedly execute a predetermined operation in each term defined by the number of frames represented by the compression frequency setting information.

4. The image processing apparatus according to claim 1, wherein
the apparatus is configured that compression frequency setting information as information regarding the number of consecutive frames constituting the one term is made inputtable from the outside, and
the reference data generating means is configured to repeatedly execute a predetermined operation in each term defined by the number of frames represented by the compression frequency setting information.

5. An image processing method, in which preprocessed image data inputted in every frame is subjected to predetermined processing for outputting, and the processed image data is outputted in every frame, the method comprising:
a reference data generating step for generating reference data one time in one term made up of not less than two consecutive frames;
a specific reference data generating step for generating specific reference data in every frame;
a reference data compressing step for performing compression processing on the reference data one time in the one term, to generate compressed reference data;
a memory step for storing the compressed reference data into a memory;
a data expanding step for performing expansion processing on the compressed reference data stored in the memory, to generate restored reference data; and
an output image data generating step for generating the processed image data based on the specific reference data and the preprocessed image data,
wherein
in a first frame in the term, in the specific reference data generating step, the restored reference data generated in the data expanding step based on the compressed reference data stored in the memory is generated as the specific reference data,
in an intermediate frame other than the first frame and a final frame in the term, in the specific reference data generating step, the specific reference data is generated on the basis of the restored reference data generated in the data expanding step based on the compressed reference data stored in the memory and the preprocessed image data of the intermediate frame, and
in the final frame in the term, in the specific reference data generating step, the specific reference data is generated on the basis of the restored reference data generated in the data expanding step based on the compressed reference data stored in the memory and the preprocessed image data of the final frame, and in the reference data generating step, the reference data is generated based on the specific reference data and the preprocessed image data of the final frame.

6. The image processing method according to claim 4, wherein,
- in the specific reference data generating step in an a-th (a is an integer not smaller than 2) frame in the term,
- in the case of a=2, first arithmetic processing is performed using the restored reference data generated in the data expanding step and the preprocessed image data and an arithmetic result obtained is taken as the specific reference data, and
- in the case of a≥3, after execution of the first arithmetic processing an arithmetic result, obtained by repeatedly executing second arithmetic processing (a-2) times based on the preprocessed image data and the arithmetic result obtained by immediately preceding arithmetic processing, is taken as the specific reference data.

7. The image processing method according to claim 6, wherein what number of frames the object frame is in the term is recognized based on information regarding the number of consecutive frames constituting the one term, which is provided from the outside.

8. The image processing method according to claim 5, wherein what number of frames the object frame is in the term is recognized based on information regarding the number of consecutive frames constituting the one term, which is provided from the outside.

* * * * *